United States Patent [19]

Kano

[11] Patent Number: 5,588,879

[45] Date of Patent: Dec. 31, 1996

[54] DIRECT COUPLER DEVICE

[75] Inventor: Masami Kano, Kiryu, Japan

[73] Assignee: Mitsuba Electric Manufacturing Co., Ltd., Gunma, Japan

[21] Appl. No.: 363,418

[22] Filed: Dec. 23, 1994

[30] Foreign Application Priority Data

Dec. 28, 1993 [JP] Japan .................. 5-074853 U

[51] Int. Cl.⁶ ........................................... H01R 13/502
[52] U.S. Cl. ................................................. 439/686
[58] Field of Search .................................. 439/695, 686

[56] References Cited

U.S. PATENT DOCUMENTS

| | | |
|---|---|---|
| 4,390,231 | 6/1983 | Plyler et al. . |
| 4,398,135 | 8/1983 | Busch et al. . |
| 4,466,687 | 8/1984 | Frantz ................................. 439/198 H |
| 4,636,669 | 1/1987 | Plunkett et al. . |
| 4,718,865 | 1/1988 | Cordeiro ................................. 439/695 |
| 5,160,281 | 11/1992 | Calver et al. . |

FOREIGN PATENT DOCUMENTS 0248966  12/1987  European Pat. Off. .

Primary Examiner—Khiem Nguyen
Assistant Examiner—Yong Kim

[57] ABSTRACT

It is an object of the invention to provide a direct coupler device which can decrease the number of terminals. A motor lead wire 14 connected to the brush of the motor is electrically connected to an electricity supplying wire of a wire harness through a female and male coupler portions. The top of the lead wire motor 14 is connected to the opposite end portion of a male terminal portion 18 of the motor lead wire 14. The motor terminal 15 is fitted to a recess 45 which is formed on a main portion 12 of the male coupler 11 in the state in which the lead wire positions are at the bottom side, which is thereby held on the recess 45. A part of the motor terminal 15 is engaged to a cap 13 which is placed on the main portion 12, the motor terminal 15 is prevented from coming out.

12 Claims, 5 Drawing Sheets

DIRECT COUPLER DEVICE

BACKGROUND OF THE INVENTION

1. Field of the Invention

This invention relates to a direct coupler device, more particularly, to a direct coupler device for a motor between a wire harness and a lead wire for supplying electricity for driving a motor, which is effectively employed, for example in the wiring of a wiper motor.

2. Description of the Related Art

In general, a wiper apparatus for a wind shield of a car provides a wiper motor for driving a wiper shaft, as the wiper driving apparatus. As the wiper motor, a motor device with a worm reduction gear is employed. An auto stop switch for stopping a wiper blade at the lower end position of the wind shield is incorporated in the wiper motor.

The auto stop switch comprises a pair of conductive boards and a pair of moving contacts contacting the conductive boards. As a direct coupler device for holding the wire to the auto stop switch, there is the following construction. That is to say, the direct coupler device has a base formed into an approximately circular dished shape, which is made from insulation material. A rotating body is rotatably supported on a main face of the base. A pair of the moving contacts is arranged at the rotating body. A pair of the conductive boards is lyingly provided on the main face. A plurality of terminals is protrudely provided on the base so as to pass through both main faces of the base. Each terminal is electrically connected to both conductive boards.

On the opposite main face of the face on which the conductive board is attached, the wire harness connected to a power supply of the car and the like may be electrically connected to each terminal through the coupler. In this case, the coupler is inserted into the group of terminals, perpendicular to the main face of the base. Further, a lead wire (hereinafter, called a "motor lead wire") for supplying electricity to a motor device with a worm reduction gear might be electrically connected to each terminal through the coupler. It is to be desired that the motor lead wire, with each terminal (hereinafter called a "switch terminal") of the auto stop switch, is constructed so as to be electrically connected to the wire harness by a unified coupler.

Therefore, in this kind of direct coupler device of the prior art: a terminal for a motor lead wire is assembled so as to be connected to a coupler of the wire harness side near a switch terminal; furthermore, an auxiliary terminal is unitarily connected to a terminal for a lead wire; the construction in which a joint terminal is fitted to the auxiliary terminal is adopted.

However, in the prior direct coupler device constructed as in the above, more than two terminals are employed between one motor lead wire and the wire harness, so that not only might the manufacturing cost be high, but also electric contact portions increase by the contact between one surface and another surface.

SUMMARY OF THE INVENTION

It is an object of the present invention to provide a direct coupler device which can decrease the number of terminals.

So as to satisfy these objects, the present invention provides a direct coupler device wherein a lead wire connected to the brush of a motor is electrically connected to an electricity supplying wire of a wire harness through a female coupler and a male coupler, the direct coupler device comprising:

an end portion of the lead wire is connected to an opposite end portion of a male terminal portion of a terminal;

the terminal is inserted to a recess(es) which is(are) formed on a main portion of the male coupler in the state in which the lead wire position is at the bottom side of the male coupler, whereby the terminal is held on the male coupler; and a part of the terminal is engaged to a cap which is covered on the main portion;

whereby the terminal is prevented from coming out.

According to the present invention, the terminal directly connected to the motor lead wire is supported by a cap, is pushed by the female coupler portion connected to the male coupler, and is fixed, so that the terminal of one motor lead wire is sufficient to be one, and it is possible to connect the motor lead wire to the wire harness through the male coupler and the female coupler.

Since one terminal per one motor lead wire is sufficiently connected to one wire through the coupler, it is possible to improve productivity.

Furthermore, it is possible to be able to decrease contact resistance.

DESCRIPTION OF THE PREFERRED EMBODIMENT

Figure 1:
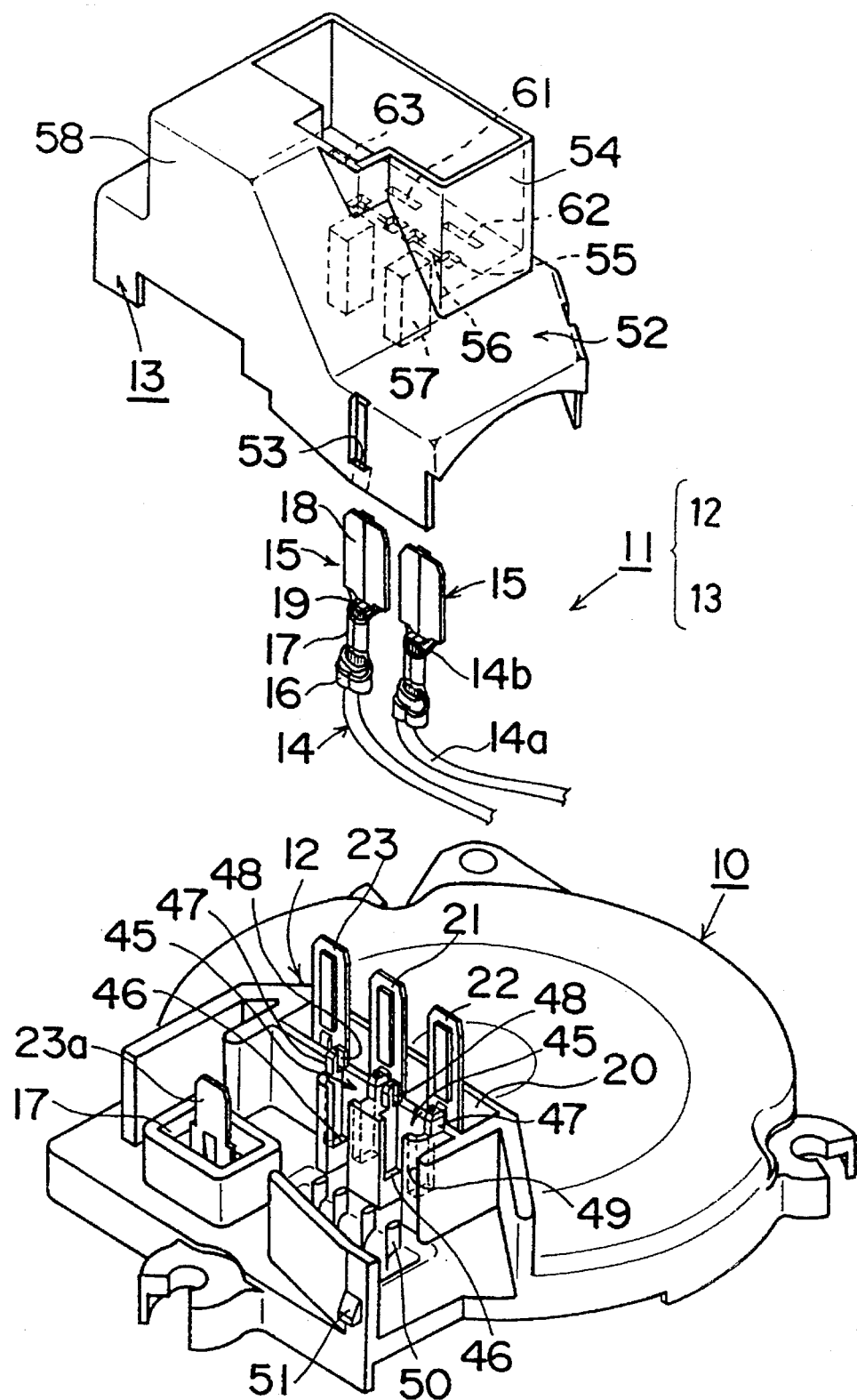
FIG. 1 is an exploded perspective view showing a direct coupler device for a motor in accordance with the embodiment of the present invention.
Figure 2:
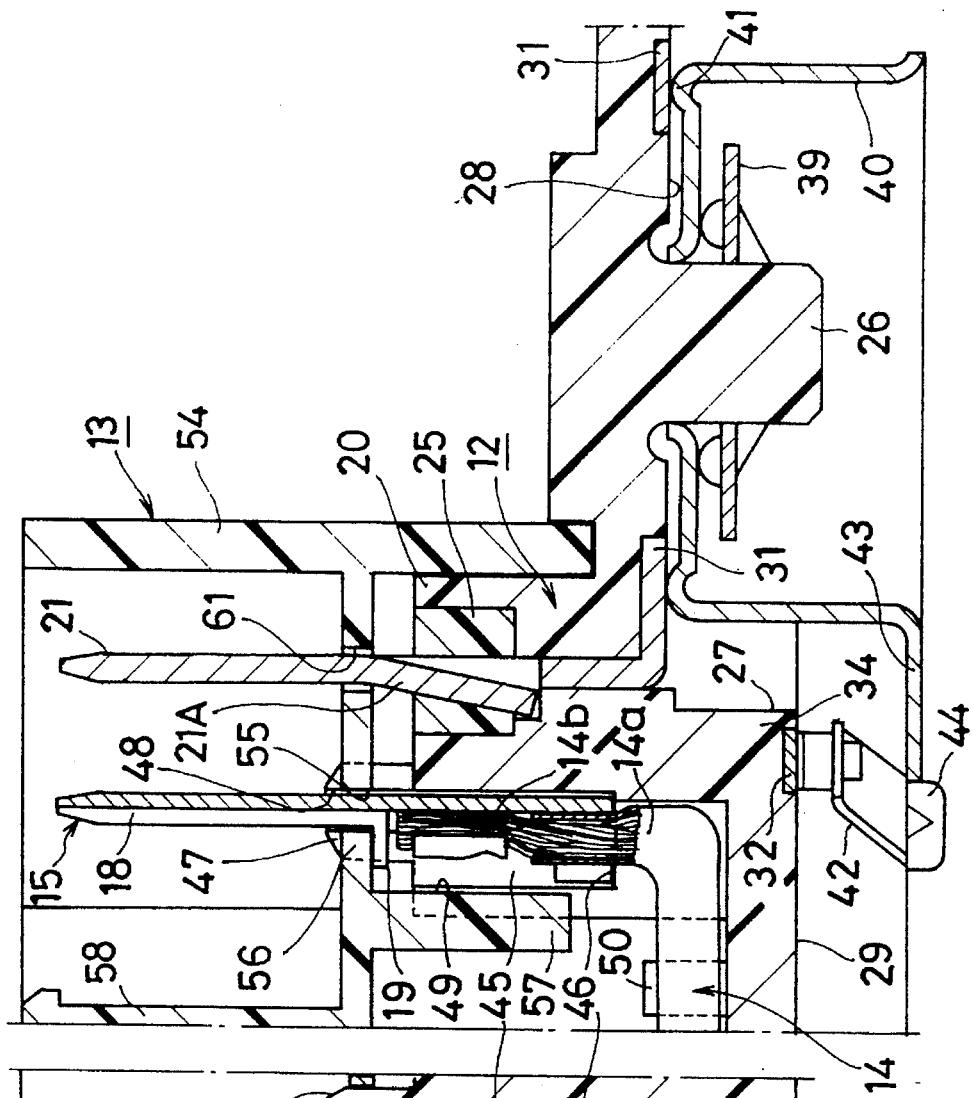
FIG. 2(a) is a side sectional view showing a sectional part of a motor lead wire.
FIG. 2(b) is a sectional view along the line b—b of FIG. 2(a)
Figure 3:
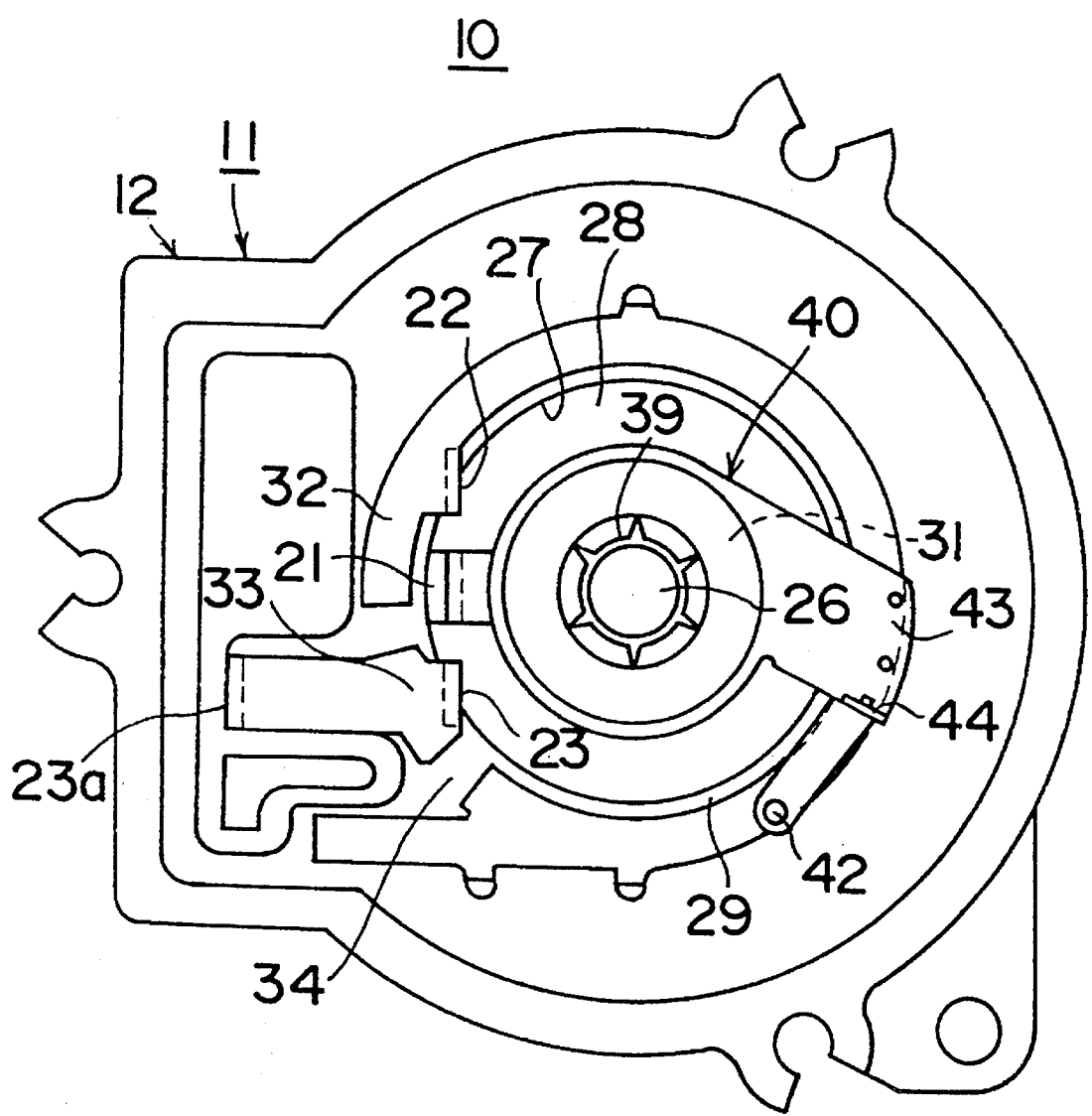
FIG. 3 is a bottom view of the direct coupler device for a motor.

In this embodiment, a direct coupler device for a motor in accordance with the present invention, which is unitarily formed at the motor, which is constructed as a direct coupler device for connecting between a lead wire for supplying electricity to a wiper motor (not shown) mounted on a car and a wire harness for electrical wiring to a wiper motor and an auto stop switch included therein.

In this embodiment, the direct coupler device for a motor is provided with a base 10 unitarily formed from resin having insulation properties, the base 10 is a part of the structure of a gear housing (not shown) of the wiper motor. The base 10 is formed into an approximately circular dished shape, a male coupler 11 is formed on the outside main face (hereinafter, called "the upper face") of the base 10, in a overturning state. A female coupler (not shown) connected to a power supply of a car is detachably connected to the male coupler 11.

The male coupler 11 is provided with a main portion 12 and a cap 13. The main portion 12 is unitarily formed on the upper face of the base 10, and is formed into a frame shape which is approximately rectangular. In the main portion 12, a terminal section 20 is arranged at the inside end portion in the diameter direction of the base 10, which is formed into a frame shape which is rectangular in plane view. In the terminal section 20, a first terminal 21, a second terminal 22 and a third terminal 23 are arranged on the same straight line. Each first terminal 21, second terminal 22 and third terminal 23 is passed through the base 10 from the lower face side to the upper face side thereof, and is projected through the terminal section 20, each upper end thereof is the same height. Further, filler 25 having insulation properties is filled in the terminal section 20, each terminal 21,22,23 is fixed by the filler 25 and an engaging pawl (engaging pawl first terminal 21a only is shown in Figure).

On the other hand, on the center of the lower face of the base 10, a supporting axle 26 formed into a columnar shape is protrudely provided downward, perpendicular to the lower face. A step 27 is coaxially formed on the outside of the supporting axle 26 of the lower face of the base 10, a first assembling face 28 and a second assembling face 29 are formed by the step 27, each height of which is different. The inner first assembling face 28 is nearer the terminal section 20 than the outer second assembling face 29, and is formed into a small circular face. The second assembling face 29 is farther from the terminal section 20 than the first assembling face 28, and is formed into a large circular ring shape.

A first conductive plate 31 is coaxially fixed on the first assembling face 28, which is formed into an approximate ring shape. The first conductive plate 31 is provided with the unitary first terminal 21. The first terminal 21 is bent upward, is passed through the base 10 from the lower face to the upper face thereof, and is projected at the center position of the terminal section 20.

Further, the second conductive plate 32 is coaxially fixed on the second assembling face 29, an approximate letter-C shape. The second conductive plate 32 is provided with the unitary second terminal 22. The second terminal 22 is bent upward, is passed through the base 10 from the lower face to the upper face thereof, and is projected at one side position of the terminal section 20.

A non-conductive portion 34 is substantially formed by a notch of the second conductive plate 32 on the second assembling face 29, a stop position plate 33 made from conductive material is coaxially arranged on the center portion of the non-conductive portion 34, which is formed into approximately board shape. The stop position plate 33 is provided with the unitary third terminal 23. The third terminal 23 is bent upward, is passed through the base 10 from the lower face to the upper face thereof, and is projected at the other side position of the terminal section 20.

Further, the stop position plate 33 is provided with the unitary third terminal 23a. The third terminal 23a is bent upward, is passed through the base 10 from the lower face to the upper face thereof, and is projected at a connecting caulked portion 17 which is formed on the main portion 12. The stop position plate 33 is provided with the unitary third terminal 23a and the third terminal 23, so that the third terminal 23a and the third terminal 23 are electrically connected to the stop position plate 33 and are electrically connected to each other. A lead wire (not shown) of a base for constructing a closed circuit of the motor is connected to the third terminal 23a.

On the supporting axle 26, a clutch (rotating body) 40 as rotating body is fitted, thereby, and is rotatably supported. Further, a push nut 39 is fitted on the top of the supporting axle 26, above the clutch 40. The clutch 40 is prevented from coming out from the supporting axis 26 by the push nut 39.

The clutch 40 is made from conductive material such as copper, and is formed into a cylindrical shape, short in height, closing the lower end portion. A first moving contact 41 is formed in a swelled manner outward in the axial direction at the outer face of the closing wall of the clutch 40. The first moving contact 41 slides on the first conductive plate 31 provided on the first assembling face 28. The first moving contact 41 is formed into half circle shape in cross section, and is pushed on the first conductive plate 31 by a moderate elastic force of the first moving contact 41 and the push nut 39.

A bracket 43 is projectly provided at the end of the clutch 40 outward in the diameter direction. The end of a second moving contact 42 is fixed at the bracket 43 so as to rotate with clutch 40. The second moving contact 42 and the first moving contact 41 are electrically connected to each other through the bracket 43. The free end of the second moving contact 42 slides on the second conductive plate 32, the non-conductive portion 34 and stop position plate 33 with circular orbit, so that the second moving contact 42 may be press touched thereon.

A engaging projection 44 is vertically bent downward at the bracket 43 of the clutch 40, the engaging projection 44 is engaged to a driving gear (not shown) which is rotatably supported by a gear housing in the wiper motor. In this embodiment, in the state in which the engaging projection 44 is engaged to the driving gear, the clutch 40 as rotating body is rotated by the driving gear.

In this embodiment, one end of a pair of the motor lead wires 14 of $L_o$, $H_i$ (wiper speed) is respectively connected to a motor brush ( not shown ), terminal chips ( hereinafter, called a "motor terminal") are respectively provided to the other ends of a pair of the motor lead wires 14. Namely, a part of an insulation film 14a of the motor lead wire 14 is eliminated, the conductive part is exposed, a portion 16 of the motor terminal 15 is caulked on the insulation film 14a, and a connecting caulked portion 17 is caulked on the conductive part motor terminal 15. A male terminal portion 18 of the motor terminal 15 is formed into the same shape as the terminals 21,22,23, which is predetermined so as to be inserted to the female coupler with the first terminals 21,22, 23. The motor terminal 15 is made of a plate shown in FIG. 4, such as of one piece copper, by bending it. The male terminal portion 18 is provided with a unitary engaging claw 19. The engaging claw 19 is provided at the lower end of both sides of the male terminal portion 18 of the plate, which is bent perpendicular to the face of the male terminal portion 18. The engaging claw 19 is engaged to a engaging claw 56.

Figure 5:
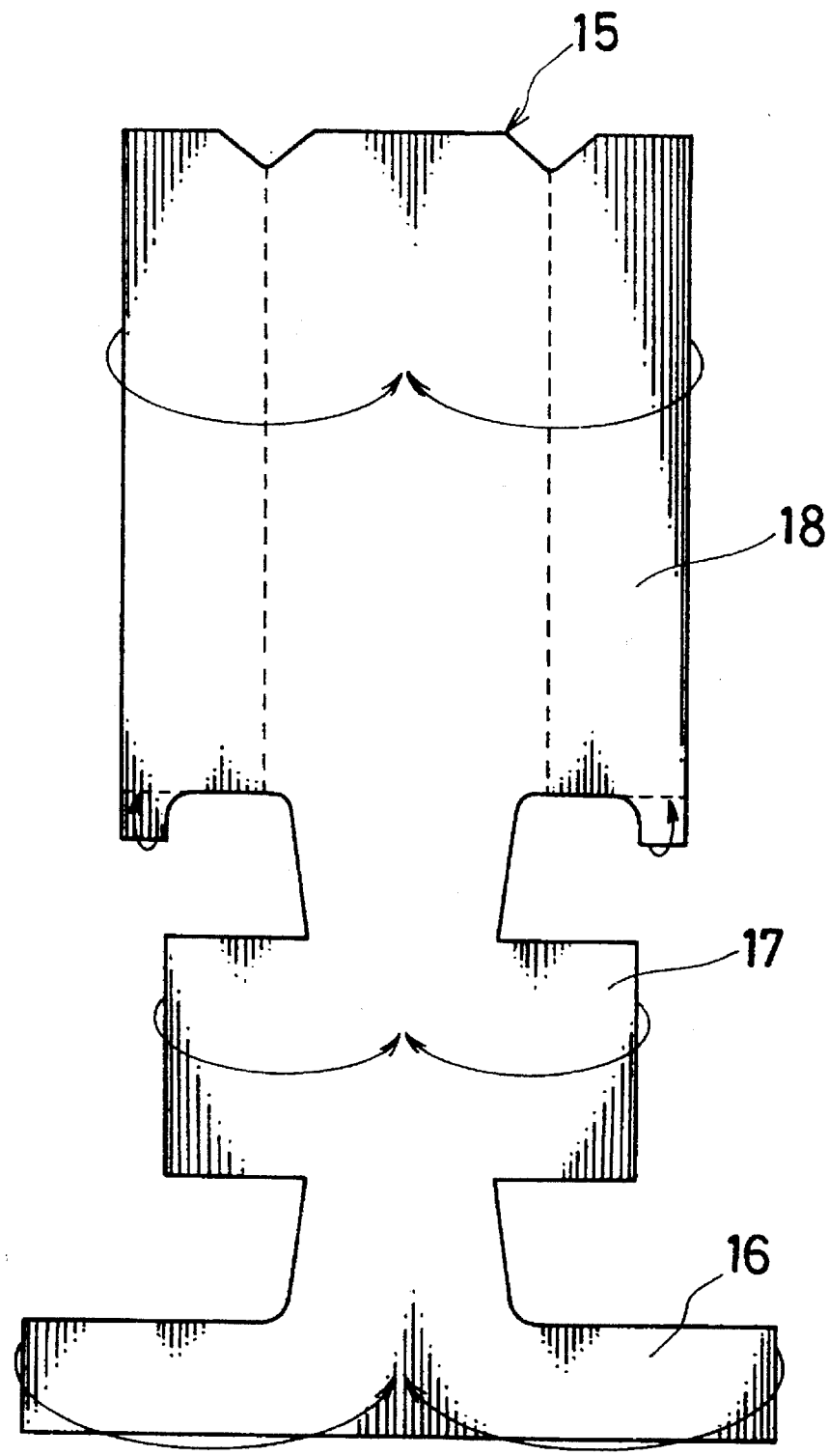
FIG. 5 is a developmental plan view of the terminal.

On the other hand, the male coupler 11 of the main portion 12 on the base 10 is provided with a pair of recesses 45. Each recess 45 is arranged at the outside of the terminal section 20, in the diameter direction of the base 10, which is opened so as to open upward. Both recesses 45 are arranged on the line which is parallel to the line on the first terminals 21,22,23, adjacent to the terminals 21,22,23. The inside width (B') of each recess 45 is, as shown in FIG. 5 and 6, predetermined to be larger than the outside diameter (B) of the 16 of the motor terminal 15, and is constructed so as to be able to insert the 16 therein. The width (D') of the recess 45 is larger than the diameter(s) (D) of the connecting caulked portion 17 and/or the 16. An engaging portion 46 is respectively provided on the each side of the recess 45. The engaging portion 46 is higher than the face of the recess 45, and is little larger than the diameter of the motor lead wire 14. The width of engaging portion 46 is constructed so that the lower end of the 16 of the motor terminal 15 might be engaged thereto.

Figure 4A:
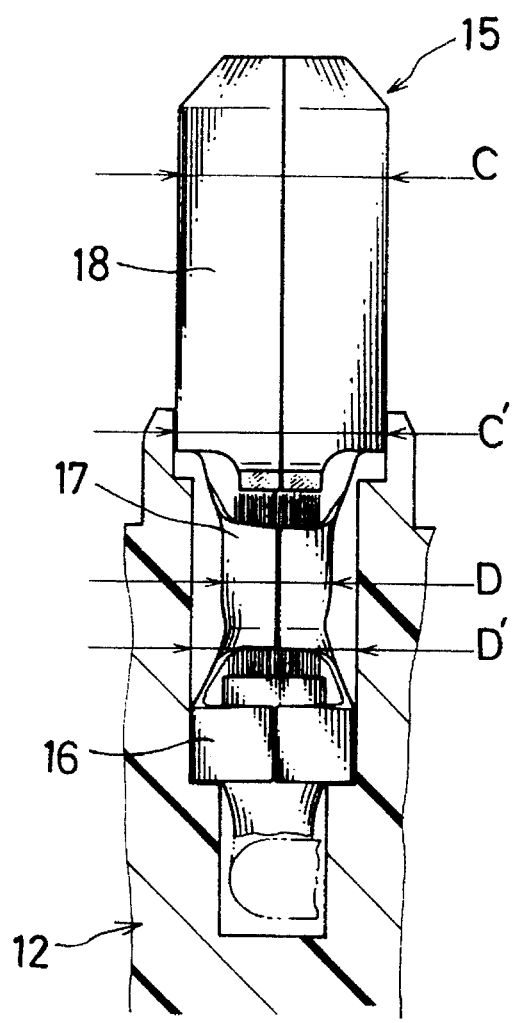
FIG. 4(a) is a sectional front view of the terminal.
Figure 4B:
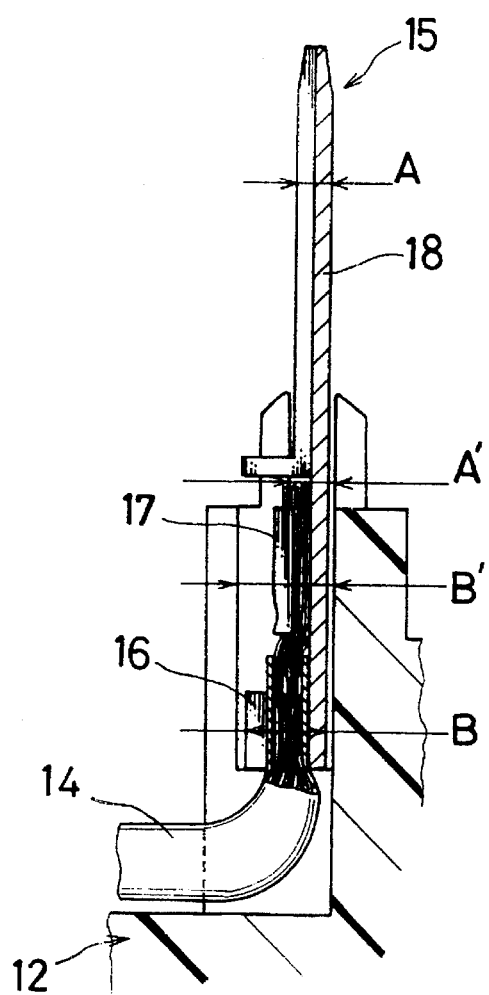
FIG. 4(b) is a sectional side view of the terminal.

Further, a pair of the projecting portions 47 are provided at both sides on the upper end of each recess 45. The top portion of each projecting portion 47 is tapered so as to easily pass through passing hole 55 of the cap 13. A pair of holding grooves 48 is vertically provided on the inside face of each projecting portion 47 so as to face toward each other. As shown in FIG. 4(a) and 4(b), the width (A') of the holding groove 48 is generally equal to the thickness (A) of the male terminal portion 18 of the motor terminal 15. The gap (C') between the holding grooves 48 is generally equal to the width (C) of the male terminal portion 18. The motor terminal 15 is supported by inserting the both sides of the male terminal portion 18 therein.

Furthermore, a guide hole 49 is vertically opened at the outside wall of each recess 45, in the diameter direction of the base 10, with constant width. The guide hole 49 is constructed so that a guide member 57 might be inserted therein.

A motor lead wire holding section 50 is unitarily provided in a projecting manner on the outside position of each recess 45 on the upper face of the main portion 12, in the diameter direction of the base 10. The motor lead wire holding section 50 has a pair of columns, the insulation film 14a of the motor lead wire 14 is held between both columns, the motor lead wire 14 might be hereby held. A plurality of engaging pawl 51 is formed at the side wall of the main portion 12.

The cap 13 of the male coupler 11 is provided with a cover 52 which is substantially formed into the approximate shape of the main portion 12 in plane view. A plurality of engaging pawls 53 is provided on the cover 52 so that the engaging pawl 51 formed on the main portion 12 might be engaged thereto. The cap 13 is fixed on the main portion 12 by engaging it between the engaging pawl 51 and engaging pawl 53 in a state to cover the main portion 12. The male coupler 11 is constructed in this fixed state.

A coupler frame 54 is unitarily provided in a protruding manner on the upper face of the cover 52, which is formed into a rectangular frame shape. The inside length and the inside width of the coupler frame 54 are predetermined so as to be able to insert the frame (not shown) of the female coupler thereinto. Gaps 61,62,63 for passing the terminals 21,22,23 therethrough are opened at the upper wall of the cover 52 in the coupler frame 54, each shape of which is a long and slender rectangular shape so that the terminals 21,22,23 might be inserted therein. A pair of passing holes 55 for passing the terminals 15 for a motor therethrough is opened at the outside position of the passing gaps 61,62,63, in the diameter direction of the base 10, each shape of which is a letter-I shape so that the motor terminal 15 might be inserted therein. Both passing holes 55 are arranged on the same line parallel to the line of the passing gaps 61,62,63. A pair of engaging claws 56 is formed at both sides of each passing hole 55 so as to engage to the male terminal portion 18 of the motor terminal 15.

Further, a pair of the guide members 57 is vertically provided on the lower face of the cover 52 downward, at both sides of one passing hole 55, the outside position in the diameter direction of the base 10. Each guide member 57 is constructed so as to be fitted into the guide hole 49 opened at the recess 45. The cap 13 is guided to the main portion 12 by fitting between the guide member 57 and the guide hole 49.

A swelling portion 58 is unitarily formed in a swelling manner on swelling portion 58 adjacent to the coupler frame 54. The swelling portion 58 is formed so as to cover the above space of the connecting caulked portion 17 of the main portion 12 and the motor lead wire holding section 50.

Next, the assembling steps of the motor lead wire 14 are described.

In the state in which the motor lead wire 14 is connected to the motor terminal 15, each motor terminal 15 is fitted in the recess 45 on the base 10, from the motor lead wire 14 side. When fitting, the portion 16 of the motor terminal 15 is fit fully in the recess 45. When the motor terminal 15 has been fitted, both sides of the male terminal portion 18 of the motor terminal 15 are guided in the holding groove 48 by the guide member 57 and the guide hole 49, so that the shaking of the motor terminal 15 in the width direction and the thickness direction thereof is prevented by the holding groove 48. That is to say, the thickness (B') of the recess 45 is larger than the diameter (B) of the 16 in order to insert the 16 in the recess 45, but the width (A') of the holding groove 48 is generally equally to the thickness (A) of the male terminal portion 18, so that the shaking of the motor terminal 15 in the thickness (A) direction thereof is prevented. The width (D') of the recess 45 is larger than the diameter(s) (D) of the 16 and/or the connecting caulked portion 17 in order to insert the 16 and the connecting caulked portion 17 in the recess 45, but the gap (C') between the holding grooves 48 is generally equal to the width (C) of the male terminal portion 18, so that the shaking of the motor terminal 15 in the width (C) direction thereof is prevented.

When the motor terminal 15 is fitted in the recess 45 completely, the lower end face of the 16 of the motor terminal 15 is touched on a pair of engaging portions 46 on the bottom portion of the recess 45. By this touching, the motor terminal 15 is in the state in which the lower position thereof is stopped, so that the motor lead wire 14 connected to the 16 is not damaged, breaking and damage of the motor lead wire 14 does therefore not appear excessively, thus, the motor lead wire 14 is prevented from breaking and damage.

Next, the end of the motor lead wire 14 is held by putting between the columns of the motor lead wire holding section 50. The motor terminal 15 is in a state to be temporary fitted to the main portion 12 by the hold of the motor lead wire holding section 50 and the holding groove 48.

After that, the main portion 12 is covered by the cap 13, each engaging pawl 51 and engaging pawl 53 are engaged to each other, the cap 13 is thereby fixed on the main portion 12. When covering, the terminals 21,22,23 are respectively inserted in the passing gaps 61,62,63, the terminals 15 for a motor are respectively inserted in the passing holes 55, and the guide member 57 is fitted into the guide hole 49 of recess 45. The projecting portion 47 is fitted into both sides of the passing hole 55 of the cap 13 in the state to holding the male terminal portion 18. Thus, the cap 13 is fixed on the main portion 12 by covering thereon suitably.

In the state in which the cap 13 is fixed on the main portion 12 of the male coupler 11, the engaging claw 56 of the cap 13 is engaged to the engaging claw 19 of the motor terminal 15 from above thereof, so that the motor terminal 15 is in the state to be prevented from coming out from the cap 13 in vertical direction, by the cap 13.

When the female coupler (not shown) connected to a power supply of the car is jointed to the male coupler 11 assembled as above, terminals of the female coupler side, electrically connected to the wire harness, are respectively fitted to the terminals 21,22,23 and the motor terminals 15,15. The wire harness, and an auto stop switch and the motor lead wire 14 are electrically connected to each other. When a coupler frame of the female coupler of the wire harness side is fitted into the coupler frame 54 of the male coupler 11, each terminal is automatically fitted to each other.

The present invention is not limited to this embodiment; insofar as the essence of the invention is not deviated from, it goes without saying that the present invention can be modified.

For instance, the number of the motor lead wire 14 is two, it is also possible to be one or more than three.

What is claimed is:

1. A direct coupler device wherein a lead wire connected to a brush of a motor is electrically connected to an electricity supplying wire of a wire harness through a female coupler and a male coupler, said direct coupler device comprising:

a male coupler including a main portion and a cap covering said main portion, said main portion having a recess and also having a bottom side and a top side, a terminal having a male terminal portion and an end portion opposite to said male terminal portion, which end portion of said terminal is connected to an end portion of said lead wire, said terminal being received in said recess with said lead wire positioned at said bottom side of said male coupler; and a part of said terminal being engaged with said cap whereby said terminal is held to and prevented from coming out of said male coupler by movement in the direction toward said cap.

2. The direct coupler device in accordance with claim 1, wherein:

said main portion of said male coupler is unitarily formed on a gear cover of said motor.

3. A direct coupler device in accordance with claim 1, wherein:

said recess of said main portion of said male coupler is provided with a holding portion for said lead wire.

4. A direct coupler device accordance with claim 1, wherein:

said terminal is provided with a unitary claw engaged by said cap; whereby said terminal is held in said recess.

5. A direct coupler device in accordance with claim 1, wherein:

said recess has an upper portion with two sides provided respectively with two projecting portions with grooves facing each other to form a gap therebetween, said gap being generally equal to the width of said male terminal portion; and said terminal having two sides received respectively in said two grooves with each side being fitted to its associated one of said grooves, whereby said terminal may be temporarily held is said recess by said grooves before said cap is assembled onto said main portion.

6. A direct coupler device in accordance with claim 5 wherein:

said cap has two passing holes for respectively receiving each of said two projection portions, and each of said projecting portions has a top portion tapered so as to easily pass through the associated one of said passing holes when said cap is moved into assembly with said main portion.

7. A direct coupler device in accordance with claim 5, wherein:

said terminal has a caulked portion below said male terminal portion, the width of said recess is smaller than the width of said male terminal portion so that only both sides of the lower portion of said male terminal portion may be engaged with said grooves; and the width of said recess is generally larger than the diameter of said caulked portion of said terminal, and the thickness of said recess is generally larger than said diameter of said caulked portion of said terminal so that said caulked portion of said terminal may be inserted into said recess;

whereby said terminal may be temporarily held in said recess before said cap is assembled with said main portion.

8. A direct coupler device in accordance with claim 1, wherein:

said end portion of said lead wire has an end face, and, said terminal is provided with a unitary claw engaged with said end face of said lead wire for positioning said end face of said lead wire.

9. A direct coupler device in accordance with claim 1, wherein:

said lead wire has a caulking portion located adjacent said opposite end-of said terminal, said recess is provided with a unitary engaging portion which is engaged with said caulking portion of said lead wire;

whereby said terminal is insertable into a female coupler corresponding thereto without damage to said lead wire.

10. A direct coupler device in accordance with claim 1, wherein:

said end portion of said lead wire has an end face, and said terminal is made by bending an initially flat one piece conductive plate to form a male terminal portion for connecting to a female terminal portion corresponding thereto, an end portion opposite to said male terminal portion for connection to said end portion of said lead wire, and an engaging claw for positioning said end portion of said lead wire by engagement with said end face of said lead wire.

11. A direct coupler device in accordance with claim 1, wherein:

said end portion of said lead wire has an end face, and said terminal is provided with a unitary claw for positioning said opposite end of said lead wire by engagement with said end face when said lead wire is connected to said terminal.

12. A direct coupler device in accordance with claim 1, wherein:

said terminal is provided with a unitary claw for engagement with said cap to position said opposite end of said lead wire when said lead wire is connected to said terminal and to hold said terminal in said male coupler.

* * * * *